(12) United States Patent
Romero et al.

(10) Patent No.: US 7,451,183 B2
(45) Date of Patent: *Nov. 11, 2008

(54) ASSEMBLY AND METHOD FOR BALANCING PROCESSORS IN A PARTITIONED SERVER

(75) Inventors: Francisco J. Romero, Plano, TX (US); Isom Crawford, Royce City, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 833 days.

This patent is subject to a terminal disclaimer.

(21) Appl. No.: 10/394,608

(22) Filed: Mar. 21, 2003

(65) Prior Publication Data

US 2004/0199632 A1    Oct. 7, 2004

(51) Int. Cl.
*G06F 15/16* (2006.01)
*G06F 15/173* (2006.01)
*G06F 15/177* (2006.01)

(52) U.S. Cl. .................. 709/206; 709/213; 709/201; 709/224; 712/13; 717/149

(58) Field of Classification Search ......... 709/212–226, 709/200–204, 206–209, 245–250; 714/10–12, 714/1, 13, 3, 7, 8; 719/310–318; 710/104, 710/302; 712/13, 20, 23, 203, 227, 11, 15; 711/153; 718/100–105
See application file for complete search history.

(56) References Cited

U.S. PATENT DOCUMENTS

| | | | |
|---|---|---|---|
| 5,675,785 A * | 10/1997 | Hall et al. | 707/102 |
| 6,151,688 A | 11/2000 | Wipfel et al. | |
| 6,182,109 B1 | 1/2001 | Sharma et al. | |
| 6,223,202 B1 | 4/2001 | Bayeh | |
| 6,389,012 B1 * | 5/2002 | Yamada et al. | 370/357 |
| 6,460,082 B1 | 10/2002 | Lumelsky et al. | |
| 6,574,748 B1 * | 6/2003 | Andress et al. | 714/11 |
| 6,633,916 B2 * | 10/2003 | Kauffman | 709/229 |
| 6,647,508 B2 * | 11/2003 | Zalewski et al. | 714/3 |
| 6,681,316 B1 * | 1/2004 | Clermidy et al. | 712/11 |
| 6,725,317 B1 * | 4/2004 | Bouchier et al. | 710/312 |
| 6,826,709 B1 * | 11/2004 | Clermidy et al. | 714/4 |
| 6,845,431 B2 * | 1/2005 | Camble et al. | 711/152 |
| 6,898,642 B2 * | 5/2005 | Chafle et al. | 709/248 |
| 6,901,446 B2 | 5/2005 | Chellis et al. | |

(Continued)

FOREIGN PATENT DOCUMENTS

| | | |
|---|---|---|
| JP | 2002-132741 | 5/2002 |
| JP | 2002-202959 | 7/2002 |

OTHER PUBLICATIONS

"an HP white paper, hp server rp7410", pp. 1-80, copyright Hewlett-Packard Company, Feb. 2, 2002 (Hereafter HP-Server).*

*Primary Examiner*—Haresh N Patel

(57) ABSTRACT

A system and method for automatically allocating computing resources in a partitioned server. The method includes determining that a partition of the partitioned server requires activation of a reserve processor, determining that another partition of the partitioned server has an active processor that may be deactivated, activating the reserve processor, and deactivating the active processor. An article of manufacture including a machine-readable medium having stored thereon instructions for automatically allocating computing resources in a partitioned server.

13 Claims, 3 Drawing Sheets

U.S. PATENT DOCUMENTS

| | | | |
|---|---|---|---|
| 6,973,517 B1 * | 12/2005 | Golden et al. | 710/104 |
| 7,032,037 B2 | 4/2006 | Garnett et al. | |
| 7,051,098 B2 | 5/2006 | Masters et al. | |
| 7,051,188 B1 * | 5/2006 | Kubala et al. | 712/29 |
| 7,089,413 B2 * | 8/2006 | Erickson et al. | 713/2 |
| 7,140,020 B2 * | 11/2006 | McCarthy et al. | 718/104 |
| 2002/0129127 A1 * | 9/2002 | Romero et al. | 709/220 |
| 2003/0115157 A1 * | 6/2003 | Circenis | 705/400 |
| 2003/0126202 A1 | 7/2003 | Watt | |
| 2003/0140143 A1 * | 7/2003 | Wolf et al. | 709/225 |
| 2003/0233391 A1 * | 12/2003 | Crawford et al. | 709/104 |
| 2004/0010581 A1 * | 1/2004 | Dodapati et al. | 709/224 |
| 2004/0111506 A1 * | 6/2004 | Kundu et al. | 709/223 |
| 2004/0148394 A1 * | 7/2004 | Circenis et al. | 709/226 |
| 2004/0148607 A1 * | 7/2004 | Circenis et al. | 718/102 |
| 2004/0162901 A1 | 8/2004 | Mangipudi et al. | |
| 2004/0193674 A1 * | 9/2004 | Kurosawa et al. | 709/201 |
| 2006/0129687 A1 | 6/2006 | Goldszmith et al. | |

* cited by examiner

PARTITIONED SERVER
PARTITIONED SERVER WITH RESERVE CPUs

PARTITIONED SERVER
PARTITIONED SERVER WITH RESERVE CPUs
AFTER REBALANCING OPERATION

ASSEMBLY AND METHOD FOR BALANCING PROCESSORS IN A PARTITIONED SERVER

CROSS-REFERENCES TO RELATED APPLICATIONS

This patent application is related to the following commonly assigned patent applications: U.S. patent application Ser. No. 09/493,753, now U.S. Pat. No. 7,228,546, entitled "Dynamic Management of Computer Workloads Through Service Level Optimization," filed Jan. 28, 2000; U.S. patent application Ser. No. 09/562,590, now U.S. Pat. No. 6,725,317, entitled "Reconfiguration Support for a Multi-Partition Computer System," filed Apr. 29, 2000; and U.S. patent application Ser. No. 10/206,594, now U.S. Pat. No. 7,140,020, entitled "Dynamic Management of Virtual Partition Computer Workloads Through Service Level Optimization," filed Jul. 26, 2002. All of these U.S. patent applications are fully incorporated herein by reference thereto, as if repeated verbatim immediately hereafter.

BACKGROUND OF THE INVENTION

1. Field of the Invention

Embodiments of the present invention relate generally to computer systems. More particularly, embodiments of the present invention relate to an assembly and method for balancing processors across hardware-based server partitions using spare processors. More particularly further, embodiments of the present invention relate to an assembly and method for dynamically reconfiguring a partitioned server by migrating one or more processors across hardware-based partitions in a partitioned server.

2. Description of the Background Art

Modern server architectures support hardware-based partitioning (e.g., see Sun's Ultra Enterprise Dynamic Domains, and HP's nPARs in Superdome, by way of example only). A partitioned server runs an independent copy of the operating system and applications on each partition, thus creating multiple operating environments on a single system. The benefits of hardware-based partitioning are: (i) increased system utilization; (ii) electrical isolation of partitions; (iii) ability to perform online upgrades on a partition without impacting other partitions; and (iv) the ability to resize partitions to meet workload demands over time. The architecture of partitioned servers is usually modular, with a "cell" or module comprising processors, memory and I/O, being the building block for partitions. A partition typically includes one or more cells working together and running a single copy of an operating system, and providing the user of that partition a shared-memory multiprocessor environment. Some implementations allow the addition, deletion and relocation of partitions without rebooting the operating system running on the affected partitions. Other implementations require a partition reboot whenever the number of cells in the partition changes.

One limitation with hardware-based partitioning is that the unit of allocation, the cell, can be significantly "heavy" in terms of granularity, and dynamic cell allocation to meet spikes in demand is too coarse an operation to be useful without causing major application performance shifts. A cell as indicated normally consists of one or more processors, memory and I/O modules. Because a cell represents a significant aggregate of computer power, migrating a cell from a partition to another is not an operation that can be performed frequently because (i) the cell might contain more resources than necessary; even if only one processor (e.g., CPU) needs to be migrated, a cell will migrate several processors; and (ii) the cost of performing cell migration is too large for it to be done automatically under software control.

Recently, server vendors have introduced the concept of capacity on demand, encompassing a number of technical and financial approaches to provide more flexibility in how server capacity is made available to users. Hewlett Packard, for example, has introduced Instant Capacity on Demand ("iCOD"), a solution that allows the customer to take possession of an HP enterprise server and pay for additional CPU resources when they are activated. This option is appropriate when the customer anticipates high demand growth, and can not predict when this demand will be needed, but must have instant access to the computer resource(s) when needed. In order to implement iCOD, servers including partitioned servers, must be shipped with more CPUs than the customer had paid for. An agent makes it possible to activate those reserve CPUs when they are needed, and facilitates auditing.

Current dynamic reconfiguration solutions for hardware-based solutions require the relocation of entire building blocks, modules or cells across partitions. This operation is complex and difficult to frequently perform. The granularity of the resources associated with any particular cell is too coarse for frequent rebalancing.

It would be desirable to have an iCOD processor which can be automatically activated in one partition at the same time another iCOD processor is automatically deactivated in another partition. The simultaneous activation and deactivation of processors results in a net zero increase of processor power, hence a net zero increase in processor cost to the owner of the server. The effect is equivalent to migrating a processor from one hardware partition to another. It would be further desirable to have an assembly and method for load-balancing partitions by virtually moving processors across partitions in a partitioned server using iCOD technology.

SUMMARY OF EMBODIMENTS OF THE INVENTION

Embodiments of the present invention provide an assembly and method for supporting processor-level (e.g., CPU-level) granular resource migration across hardware partitions by using existing reserve processors to provide a processor-granularity load balancing solution. The embodiments include creating a distributed pool of reserve processors, whose members are automatically allocated to a partition that is in most need of the reserve processors. Automatic allocation of processor reserves is operable and feasible even though cells are not able to be migrated dynamically. Furthermore, the CPU reserve pool may be implemented using any suitable capacity on demand scheme (e.g., HP's iCOD program) such that there is no cost to the customer for using the dynamic processor migration for various embodiments of the present invention.

Therefore, embodiments of the present invention provide a method for automatically balancing processors across partitions of a partitioned server. The method comprises determining that a first partition of a partitioned server requires the activation of at least one reserve processor, determining that a second partition of the partitioned server has at least one active processor that may be deactivated, activating at least one reserve processor in the first partition, and deactivating at least one active processor in the second partition. A machine-readable medium is provided having stored thereon instructions for performing one or more of the features of embodiments of this method for automatically balancing processors across partitions of a partitioned server.

Embodiments of the present invention also provide a method for automatically allocating computing resources in a partitioned server comprising identifying in a partitioned server a first partition having at least one reserve processor available for activation to meet service level objectives associated with the applications running on the first partition; identifying in the partitioned server a second partition having at least one active processor which is not allocated at the objective level; activating at least one reserve processor in the first partition; and deactivating at least one active processor in the second partition. An article of manufacture is provided having a machine-readable medium with instructions for performing any embodiments of the methods for allocating computing resources in the partitioned server.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

Figure 1:
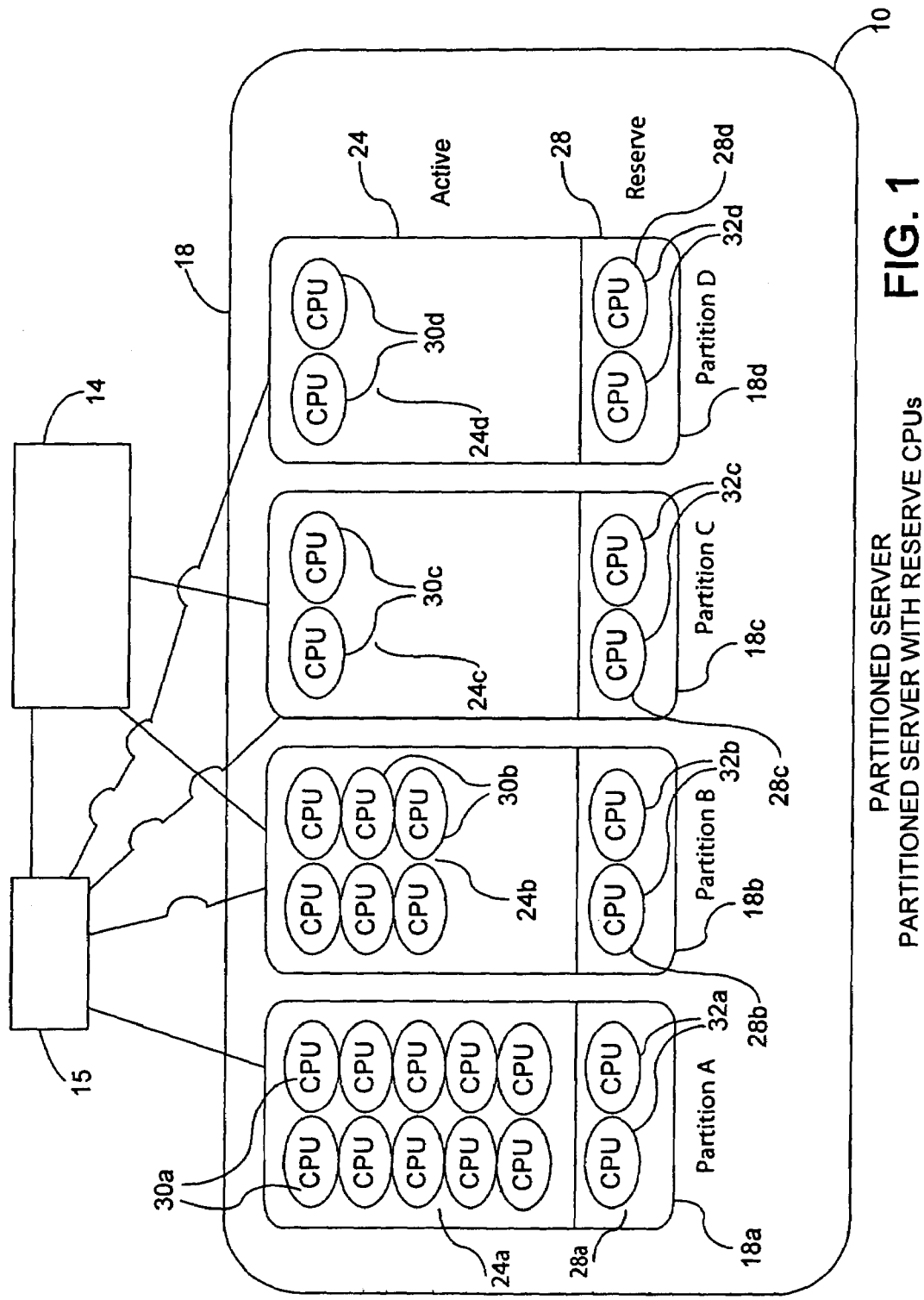
FIG. 1 is a schematic diagram of a partitioned server coupled to a workload manager.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may be any processor-containing device, such as a mainframe computer, a personal computer, a laptop, a notebook, a microcomputer, a server, or any of the like. A "computer program" may be any suitable program or sequence of coded instructions which are to be inserted into a computer, well know to those skilled in the art. Stated more specifically, a computer program is an organized list of instructions that, when executed, causes the computer to behave in a predetermined manner. A computer program contains a list of ingredients (called variables) and a list of directions (called statements) that tell the computer what to do with the variables. The variables may represent numeric data, text, or graphical images.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "Service Level Objective" (SLO) attribute for embodiments of the present invention may define a measurable characteristic of a primitive, more specifically a level of performance to be delivered by any particular application to the control system. An SLO can also be a predetermined level of resource (e.g., CPU) consumption by a workload. SLOs are associated with one or more workloads running in a partition of a partitioned server, and describe the desire resource utilization constraints on the workload and, optionally, a performance or usage goal, together with scheduling information and constraints. By way of example only, a SLO may be "Deliver X Mb/s Aggregate Throughput" for a file service, or "Process N Email Messages Per Second" for an E-mail exchange service. A SLO attribute may also be defined in terms for the computer system, instead of terms for any particular application of the control system. By further way of example only, a SLO in a computer system term may be "Maintain CPU Load Below X Percent On Each Partition Of A Partitioned Server Contributing To This Service". Such a proxy SLO attribute may be employed when it is difficult to measure attributes at the application level. A SLO attribute may also known as a "Quality of Service", or QoS, attribute.

Each partition has one or more Service Level Objectives (SLO) associated with it. As indicated, an SLO is an application performance or resource utilization goal that a workload management system (such as the one described in application Ser. No. 09/493,753) performs. Each SLO has a priority associated with it. The partition that demands more resources, and has a reserve CPU available, will activate as long as there is another partition candidate to deactivate an active processor. The candidacy is determined by the algorithm described hereinafter, and it takes into account how well SLOs are being met in the donating partition, and the relative priority of SLOs in the donating and receiving partitions.

A "processor" includes a system or mechanism that interprets and executes instructions (e.g., operating system code) and manages system resources. More particularly, a "processor" may accept a program as input, prepares it for execution, and executes the process so defined with data to produce results. A processor may include an interpreter, a compiler and run-time system, or other mechanism, together with an associated host computing machine and operating system, or other mechanism for achieving the same effect. A "processor" may also include a central processing unit (CPU) which is a unit of a computing system which fetches, decodes and executes programmed instruction and maintains the status of results as the program is executed. A CPU is the unit of a computing system that includes the circuits controlling the interpretation of instruction and their execution.

A "server" may be any suitable server (e.g., database server, disk server, file server, network server, terminal server, etc.), including a device or computer system that is dedicated to providing specific facilities to other devices attached to a network. A "server" may also be any processor-containing device or apparatus, such as a device or apparatus containing CPUs.

A "partition" for a server is a portion of the processing primitives of the server that is set aside for a special purpose, and may be treated as if it were an individual computer. For example, a partition of a server may contain one or more processors (e.g., CPUs), each of which is running its own operating system and one or more workloads. Each partition may hold and operate with one or more programs.

An "Active Processor Pool" is one or more processors (e.g., CPUs) that act in conjunction to deliver a desired service, particularly from a partition of a partitioned server. An Active Processor Pool, particularly for any partition, will have one or more SLOs (e.g., QoS attributes) associated with it, as well as a relative priority which will be used when it is necessary to remove a processor from an Active Processor Pool to meet the needs of a higher priority Active Processor Pool and no processors are available for use in any Reserve Processor Pool.

A "Reserve Processor Pool" is one or more processors (e.g., one or more processors in a particular partition) which are not currently allocated to any Active Processor Pool. One or more processor from the Reserve Processor Pool may be allocated in accordance with the dynamic, adaptive allocation and/or provisioning for various embodiments of the present invention. The processors in any Reserve Processor Pool are on standby; that is, they are powered up and connected to the active processors (i.e., the Active Processor Pool) in any partition, but are not running an operating system assigned to any particular partition of a partitioned server. One or more processors in the Reserve Processor Pool may be preloaded with any particular operating system (OS) and the application most likely to be needed by any particular Active Processor Pool.

Referring now to FIG. 1 there is broadly illustrated a schematic diagram of a partitioned server, generally illustrated as 10, coupled to a workload manager 14 (e.g. a management server, computer, or the like). For various embodiments of the present invention, the partitioned server (or computing system) 10 includes at least two partitions, more specifically a plurality of partitions, generally illustrated as 18, comprising partition 18a, partition 18b, partition 18c and partition 18d. The partitions 18 are controlled by the workload manager 14, preferably via a local area network (LAN) or a bus (all not shown in the drawings) to provide a signal interface between the workload manager 14 and respective partitions 18a, 18b, 18c and 18d. More specifically, the workload manager 14 instantiates agents in each partition that communicate with a central control system provide by the workload manager 14, which makes decisions regarding active and reserve processors, among other things.

Partitions 18 include an Active Processor Pool, generally illustrated as 24, and a Reserve Processor Pool, generally illustrated as 28. More specifically, partitions 18a, 18b, 18c and 18d include respective Active Processor Pools 24a, 24b, 24c and 24d, and respective Reserve Processor Pools 28a, 28b, 28c, and 28d. Active Processor Pools 24a, 24b, 24c and 24d, respectively include active processors (e.g., CPUS) 30a, 30b, 30c, and 30d. Reserve Processor Pools 28a, 28b, 28c, and 28d, respectively include reserve processors 32a, 32b, 32c, and 32d.

In another embodiment of the invention the partitions 18 may be coupled to a monitoring assembly 15 (e.g., a computer, server, or the like) for monitoring performance and/or usage of all active processors 24 against goals or performance criteria. The monitoring assembly 15 may be coupled to the Workload Manager 14 to receive from and to transmit to information. The Workload Manager 14 may work singularly are in combination with the monitoring assembly 15 for monitoring performance and/or usage of all active processors 24 with respect to set goals or performance requirements. Thus, it is to be understood that whenever Workload Manager 14 is mentioned, stated, or suggested herein, it is to mean either Workload Manager 14 alone, or Workload Manager 14 in combination with the monitoring assembly 15.

Each of the partitions 18 (i.e., 18a, 18b, 18c, and 18d) is running one or more workloads which has/have associated therewith one or more Service Level Objectives (SLOs). As indicated SLOs describe the desire resource utilization constraints on the workload, and, optionally, a performance or usage goal together with scheduling information and constraints. One or more of the SLOs also has/have associated therewith a priority level. The details on the operation of any SLO is described in U.S. patent application Ser. No. 09/493,753, entitled "Dynamic Management of Computer Workloads Through Service Level Optimization," fully incorporated herein by reference thereto as if repeated verbatim immediately hereinafter. The Workload Manager 14 (or the Workload Manager 14 in combination with the monitoring assembly 15) is constantly monitoring performance and/or usage of all active processors 24 against set goals, and making automatic adjustments to meet SLOs, e.g., by removing one or more reserve processors from the Reserve Processor Pool 28 and adding same to the Active Processor Pool 24, or by removing one or more active processors from the Active Processor Pool 24 and adding same to the Reserve Processor Pool 28. High priority SLOs are met first and then lower priority SLOs are subsequently met, such that the processor-capacity of the server 10 is mapped to resource needs in order of priority.

Workload manager 14 and/or monitoring assembly 15 works across and operatively spans multiple partitions 18. The active processors and reserve processors may be and are typically dedicated to their respective associated partition 18. Thus, by way of example only, active processors 30a and reserve processors 32a are typically dedicated to associated partition 18a. The server or computing system 10 executes various embodiments of the dynamic processor allocating system which is administered through the Workload Manager 14.

Thus, the Workload Manager 14 and/or monitoring assembly 15 may determine that a reserve processor (e.g., reserve processor 32b) must be removed from a Reserve Processor Pool (e.g., Reserve Processor Pool 28b) and added to the Active Processor Pool (e.g., Active Processor Pool 24b) of a particular partition (e.g., partition 18b) to meet the one or more SLOs of workload running in that particular partition. How this determination is made is described in U.S. patent application Ser. No. 09/562,590, entitled "Reconfiguration Support for a Multi-Partition Computer System," fully incorporated herein by reference thereto as if repeated verbatim immediately hereinafter.

More particularly and as disclosed in application Ser. No. 09/562,590, an allocator may be provided to resize any particular partition, which is to move processor resources from one or more Reserve Processor Pools to one or more Active Processor Pools, and vice versa, based on the instructions provided by a processor load manager (i.e., Workload Manager 14). The Workload Manager 14 and/or monitoring assembly 15 may receive appropriate goal information and priority information from a user or administrator. Such goal and priority information may be the same for all processors in one or more partitions or the information may be specific to each processor or groups of processors in one or more partitions. The Workload Manager 14, as indicated, may also receive additional information from one or more performance monitors (e.g., monitoring assembly 15), which are systems and processes that monitor the performance of the application within each of the active processors (e.g., active processors 30a, 30b, etc) in respective partitions 18 (e.g., partitions 18a, 18b, etc). The Workload Manager 14 examines the information from the performance monitors and compares the information with the goals. Based on the comparison, the Workload Manager 14 may increase, decrease, or leave unchanged, an entitlement of an application (e.g., the number of active processors in any partition for performing a workload). If the performance of an application is lagging, e.g., if transactions are taking longer than the goal, then the Workload Manager 14 increases the entitlement by removing one or more reserve processors (e.g., reserve processors 32a) and adding same to an Active Processor Pool (e.g., Active Processor Pool 24a). If an application is overachieving, then the Workload Manager 14 will decrease its entitlement and allocate it to another application. Thus, the Workload Manager 14 (or the Workload Manager 14 in combination with the monitoring assembly 15) many determine a resource request value for the server resources based on at least one priority assigned to the processors in the respective partitions 18 associated with the server resources. The Workload Manager 14 is operative to form an allocation value for each active processor in the respective partitions 18 based on a respective server resource request value such that embodiments of the server (or computing) system apportions the server resources among the Active Processor Pools (e.g., Active Processor Pools 24a, 24b, etc.) based on the allocation values. Thus, for each partition 18, the Workload Manager 14 will furnish and/or add to an Active Processor Pool for one or more particular partitions one or more processors (e.g., CPUs) being requested at each priority. The Workload Manager 14, as previously indicated, receives and has stored information on the number, if any, of reserve processors in any particular Reserve Processor Pool 28 available for allocation to an associated Active Processor Pool.

The Workload Manager 14 is typically postured in an idle loop, waiting to receive information from the partitioned server 10, more particularly the active processors (e.g., active processors 30a, 30b, etc.) associated with the respective partitions 18. As indicated, the Workload Manager 14 (and/or monitoring assembly 15) monitors the workload(s), SLO(s), and performance of each of the active processors within respective partitions 18. The information passed to the Workload Manager 14 (and/or monitoring assembly 15) consists of numeric data presenting the performance of the application on any particular active processor within respective partitions 18. For example, a composite number may be created and/or produced that reflects performance of the application on the active processors 30a within associated partition 18a. The information may be transmitted to the management server 14 either synchronously via polling at regular or periodic intervals, or synchronously via alarms sent by any monitoring system. If polling is frequently conducted, alarm transmission would not be necessary and would become an optional feature.

After the management server 14 (and/or monitoring assembly 15) receives the server partition-performance information from each of the active processors associated with respective partitions 18, all of the received server-performance information is collated, correlated and consolidated by the Workload Manager 14 which then computes or determines at least one service level for respective partitions 18. More specifically, the Workload Manager 14 for each of the partitions 18 computes or determines at least one service level (e.g. an aggregate service level) for each of the partitions 18. If the service-level attribute(s) measured or determined for the particular application or service request running or being performed by a partition 18 in the partition server 10 diverge, deviate or is skewed from a standard or goal set or placed by a user, then a determination is made if the measured or determined service-level attribute(s) fall above or below the standard or goal. If there is no deviation from the goal or standard, no action is required by the Workload Manager 14 and then the Workload Manager 14 may go back to an idle loop.

As indicated for an idle loop, the Workload Manager 14 in an idling posture (or the Workload Manager 14 in combination with the monitoring assembly 15) is monitoring the performance of the active processors associated with the respective partitions 18. If the measured service level attribute(s) is not below the goal, then the measured service level attribute is above the goal objective, and the subject partition 18 is overprovisioned, or is not working efficiently, or is not optimally operating. Thus, active-processor capacity of the subject partition 18 should be reduced by removing one or more active processors in order to increase the associated reserve processor pool and make a processor available for activation in another partition. It is possible to specify in the Workload Manager 14 thresholds of overprovisioning required for action, as well as any frequencies for action.

If the measured service-level attribute(s) is not below the goal or standard, then the measured service-level attribute is above the standard or goal and action by the Workload Manager 14 is to be executed. The action taken is for the Workload Manager 14 to select one or more of the active processors (e.g., active processors 30a) of the subject partition (e.g., partition 18a) and to dispose it or them in the reserve processor pool (e.g., reserve processor pool 28a) associated with the subject partition (e.g., partition 18a). This execution would optimize and/or make more efficient the workloads on the remaining active processor in the associated active processor pool (e.g., active processor pool 24a) associated with the subject partition (e.g., partition 18a). After the active processor selection process has been executed by the Workload Manager 14 and one or more selected active processors has been returned to a reserve processor pool 28, the Workload Manager 14 may then go back to an idle loop.

If the aggregate service-level attribute is below the goal, then a processor allocation or provisioning step should be executed. The number of processors for allocation or provisioning, as well as the severity of the deviation of the aggregate SLO attribute from the defined standard or goal, the frequency of allocation or provisioning, as well as any other desired factors, may be predefined in the Workload Manager 14. The processor allocation or provisioning step includes determining if the particular reserve processor pool (e.g., reserve processor pool 28a) has one or more reserve processors (e.g., reserve processors 32a) is/are available for draft or removal into the subject active processor pool (e.g., active processor pool 24a). If no reserve processor is available in the particular reserve processor pool, then a partition selection process is executed where a processor selection algorithm is invoked and an identification is made of one or more active processors from a lower priority partition 18, all as illustrated and particularly described in previously mentioned U.S. patent application Ser. Nos. 09/562,590, 09/493,753 and 10/206,594, fully incorporated herein by reference thereto as if repeated verbatim hereinafter. More particularly and as disclosed in application Ser. No. 09/562,590, an allocator may be provided to resize any particular active processor pool, which is to move active-processor resources from one or more active processor pools to one or more other reserve processor pools, especially for a particular partition, based on the instructions provided by a processor load manager (i.e., Workload Manager 14). The Workload Manager 14 receives goal information and priority information for each partition 18 from a user or administrator. Such goal and priority information may be the same for all processors in all partitions 18, or the information may be specific to each processor or groups of processors in each partition 18. The Workload Manager 14 may also in another embodiment of the invention receive additional information from performance monitors (e.g., monitoring assembly 15) which are processes that monitor the performance of the application of one or more processors within each of the partitions 18. The Workload Manager 14 examines the information either singularly, or in combination with the performance monitors (e.g., monitoring assembly 15), and compares the information with the goals. Based on the comparison, the Workload Manager 14 may increase, decrease, or leave unchanged, a partition application's entitlement. If the performance of a partition application is lagging, e.g., if transactions are taking longer than the goal, then the Workload Manager 14 increases the processor entitlement for any particular partition 18. If an application is overachieving, then the Workload Manager 14 will decrease a partition entitlement for a particular partition 18 and allocate one or more active processors to its associated reserve processor pool. Thus, the Workload Manager 14 may determine a processor-resource request value for a partitioned server resource based on at least one priority assigned to respective partitions associated with the partitioned server resource. The Workload Manager 14 is operative to form an allocation value for each respective partition 18 based on a respective resource request value such that embodiments of the partition system apportions the partitioned server resource among the partitions 18 based on the allocation values.

Thus, the processor selection process looks at the relative performance of each partition 18 in the partitioned server 10, as well as their priorities, to identify the one or more active processors that would impact performance the least if reallocated to a reserve processor pool. After one or more active processors have been selected, the selected active processor(s) is/are subsequently may be flushed prior to allocating to a reserve processor pool. If one or more available reserve processors is or are selected from one or more reserve processor pools 28, it or they may be initially reprovised. In order to reprovise any selected reserve processor, the selected reserve processor may be initially repurposed (e.g., installation or appropriate software and configured) in accordance with any well known manner prior to adding to one of the active processor pools 24.

Subsequently, after configuration and repurposing of the one or more selected reserve processors, the repurposed, configured one or more selected reserve processors may be subsequently readied for operation prior to addition to an Active Processor pool 24. Readying a reserve processor for operation involves any configuration operations needed to be performed after an image is initially installed and prior to the selected reserve processor(s) being declared ready. Subsequently, and after adding the repurposed, configured one or more selected reserve processors to one or more active processor pools 24, the Workload Manager may then go back to an idle loop.

Thus, by the practice of various embodiments of the present invention Active Processor pool(s) 24 and Reserve Processor pool(s) 28 only grow or shrink in the number of processors. No selection of any processor (i.e., either active or reserve processor) crosses any of the boundaries of the partitioned server 10. All selections of any processor(s) are self-contained within respective partitions 18. Processor selection takes advantage of integrated management infrastructure(s) available within respective partitions 18, but not across respective partitions 18. However, the Workload Manager 14 receives and maintains information on all processors (both active and reserve processor(s)) in all pools (both active and reserve processor pool(s)) in all partitions 18. Also, by the practice of various embodiments of the present invention adaptive controls operate across partitions 18 (which may be coupled to a network or bus), and automate the task for adjusting both active and reserve processor capacity associated with any horizontally scalable service or application.

Figure 2:
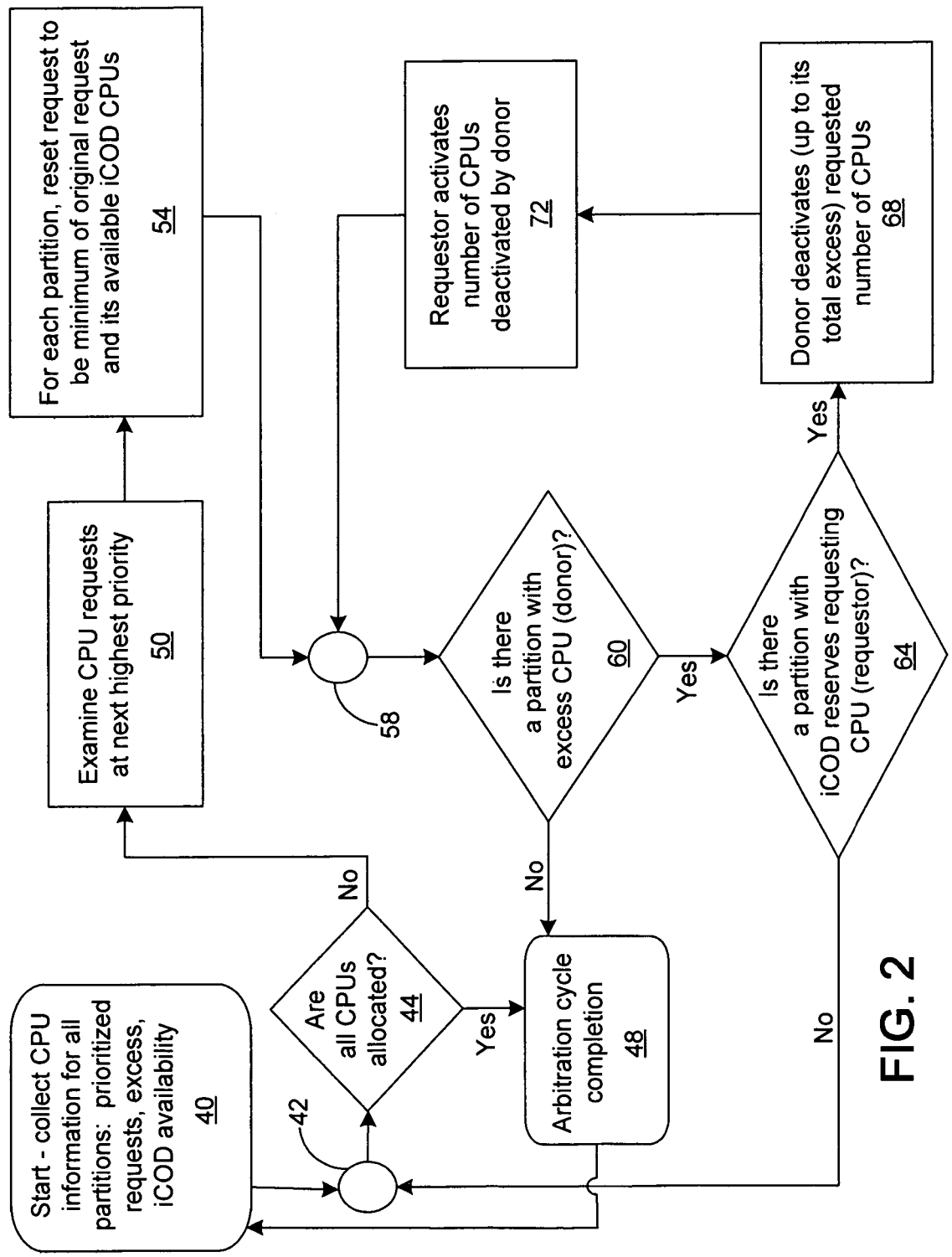
FIG. 2 is a block flow diagram of a control system for operating embodiments of the invention including a sequence of events necessary to reallocate processor resources from one partition to another partition employing Instant Capacity on Demand (iCOD) reserve processors.

Referring now to FIG. 2 there is seen a block flow diagram of a control system for operating various embodiments of the invention including a sequence of events necessary to reallocate processor resources from one partition to another partition employing reserve processors, more particularly and by way of example only, Instant Capacity on Demand (iCOD) reserve processors. In block 40 the Workload Manager 14 collects processor information on all processors (both active and reserve processors) for all partitions 18, collects processor requests for each partition 18, and adjusts the processor requests in accordance with any availability of inactive or reserve processor(s) 28 for each partition 18. More particularly, the flow diagram proceeds from block 40 to decision block 44 via juncture 42. In accordance with decision block 44, the Workload Manager 14 determines if all processors (i.e., inactive or reserve processors) have been allocated. In the context of this discussion for FIG. 2, the term "allocation" applies to the processor being assigned to a SLO. Similarly, an excess processor is one that has not yet been assigned to an SLO. If all processors have been allocated, the algorithm terminates as indicated by block 48. Block 48 iteratively communicates with block 40 to illustrate that the algorithm loops indefinitely. "Done" means no more work is needed for this cycle, but at the next iteration the cycle is repeated. If all processors have not been allocated, then the Workload Manager 14 examines processor requests at the next highest priority level, and for each partition 18 (i.e., partitions 18a, 18b, etc.), the Workload Manager 14 resets in accordance with block 54 each processor requests to a minimum of: the original processor requests or the available iCOD processors. From block 54 the flow diagram proceeds to decision block 60 via juncture 58.

In accordance with the decision block 60 a determination is made if there is a partition 18 (e.g., a donor partition) with one or more excess processors which is/are available for allocation into an active processor pool 24. If there are no excess processors available, the algorithm terminates as indicated by block 48 and subsequently passes back to block 40. If the determination in accordance with decision block 60 is positive, that is, that there is a partition available with excess processors, then a determination (see block 64) is to be made by Workload Manager 14 as to whether or not there is a partition (i.e., a requester partition) having iCOD processor reserves and requesting one or more active processors. If there is no available partition, the flow diagram proceeds back to decision block 44 via juncture 42. If there is an available partition, the available partition (or donor partition) in accordance with block 68 deactivates (up to its total excess processors) the requested number of active processors. Subsequently, and in accordance with block 72), the partition of decision block 60 (the requestor partition) activates the same number of processors which were deactivated by the partition (the donor partition) of block 68. The flow diagram proceeds from block 72 back to decision block 60 via juncture 58.

Thus, initially, the Workload Manager 14 determines if all processor resources for all partitions 18 have already been allocated (in accordance with the previously indicated procedure) at a higher priority level. If there are no remaining processors that may be allocated, then the algorithm terminates. If there is available processor resources at the next highest priority level (i.e., an identified higher priority level), then the Workload Manager 14 collects all processor requests for each partition 18, and adjusts all processor requests to take into account whether or not there are iCOD reserve (inactive) processors available on each partition 18. More specifically, the Workload Manager 14 determines if the processor request may be met by the number of iCOD reserve processors. The processor request may be recalculated or determined as follows: request=minimum[request,iCOD reserves]. Subsequently, the Workload Manager 14 identifies a partition (or donor partition) which has active processors that are not allocated to any SLO at the identified higher priority level (i.e., the next highest priority level). Such active processors are deemed to be excess processor resources at the identified higher priority level. If no such partition exists the algorithm terminates because no processor reallocation may be achieved and then subsequently passes back to box 40.

Subsequently, the Workload Manager 14 identifies a partition (or requester partition) which is requesting one or more processors at the identified higher priority level. It is to be noted that the recalculation request (i.e., request =minimum [request,iCOD reserves]) guarantees that there are iCOD reserve processors that can be activated on the requester partition. If no such requester partition is found by the Workload Manager 14, then the Workload Manager 14 examines the next higher priority level, and subsequently repeats the following steps: collects processor requests for each partition 18, adjusts the processor requests to take into account whether or not there are iCOD reserve processors available on each partition 18, identifies a processor donor partition, and identifies a processor requester partition, all as more specifically previously indicated.

After the Workload Manager 14 has identified a processor donor partition and a processor requester partition, the Workload Manager 14 proceeds with the virtual reallocation of processor resources by the processor donor partition using an iCOD interface to deallocate the requested number of processors, or the total excess processors in the processor donor partition, whichever is the less or smallest. More specifically, deallocated processors =minimum[donor partition's total excess processors, requested processor]. The requestor partition may now employ the iCOD interface to activate the same number of processors that were deallocated by the donor partition. The sequence of deactivation and activation of processors prevents the complex (i.e., all partitions 18) actually increasing the number of active processors. Otherwise, embodiments of the iCOD auditing system of the present invention may calculate the total number of processors and incur a charge for these additional processor resources.

After processor activation has been accomplished by the Workload Manager 14, each partition 18 is subsequently re-examined at the identified priority level and the algorithm continues with the Workload Manager 14 again identifying the donor partition and the requester partition. It is to be noted that if a prior donor partition still has excess processors, then it will be identified again as a donor partition by the Workload Manager 14. Similarly, if a prior processor requester has not been completely satisfied, then it will be identified again as a requester partition by the Workload Manager 14.

Figure 3:
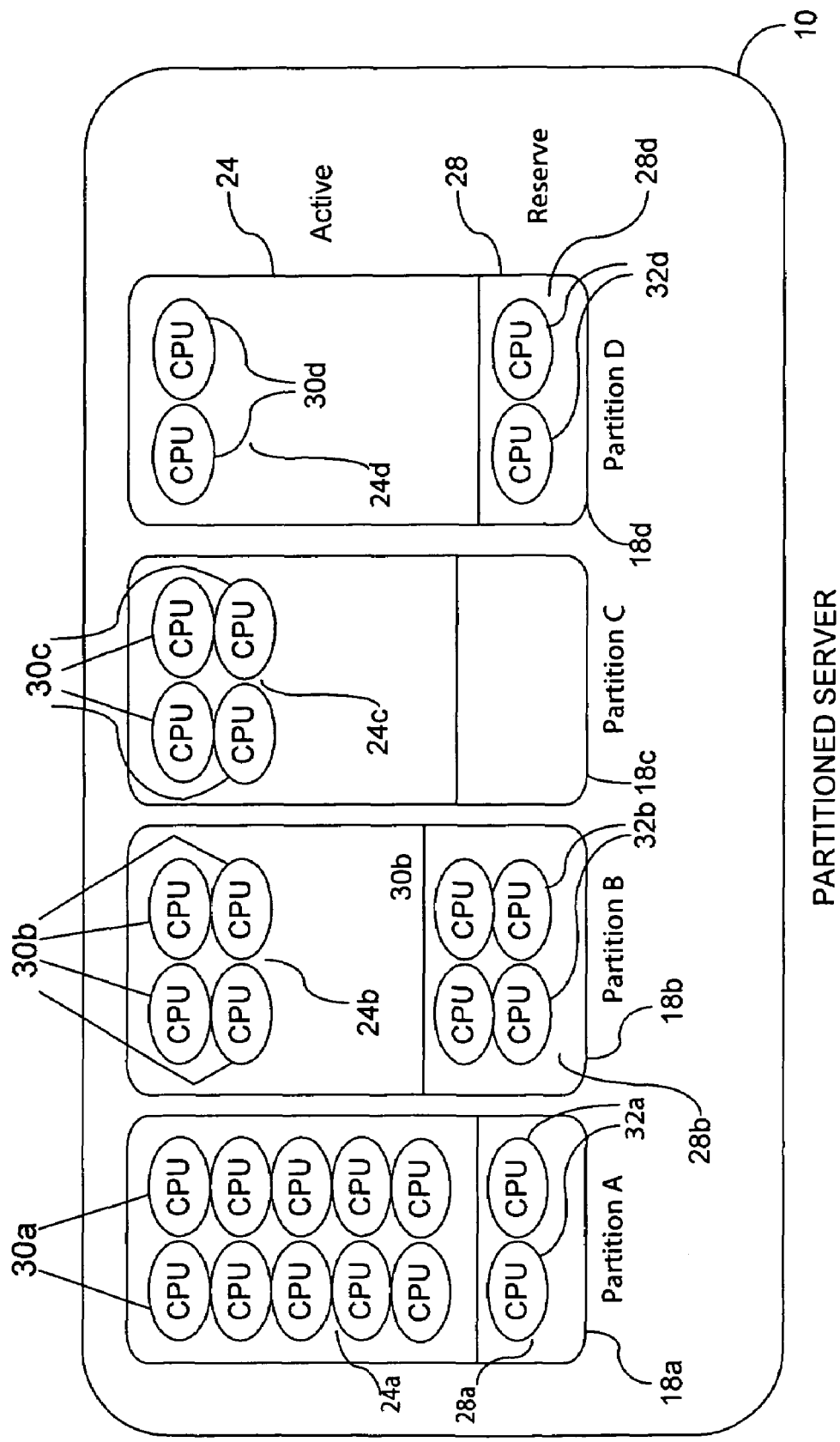
FIG. 3 is a schematic diagram of the partitioned server of FIG. 1 after the reallocation of reserve processors from one partition to another partition using iCOD reserve processors.

Referring again to FIG. 1 and now to FIG. 3 for further explanation of embodiments of the present invention and by way of example only, there is seen as previously indicated partitioned server 10 configured to have partitions 18a, 18b, 18c and 18d, respectively having 12 processors (10 active and 2 reserves), 8 processors (6 active and 2 reserves), 4 processors (2 active and 2 reserves), and 4 processors (2 active and 2 reserves). The cell module of the partitioned server 10 contains 4 processors; hence partitions 18a, 18b, 18c and 18d, respectively have 3 cells, 2 cells, 1 cell, and 1 cell. Partitions 18a, 18b, 18c and 18d each initially have 2 reserve processors which are not available to any customer until purchased when needed from a vendor, but nevertheless available for purchase in the partitioned server 10. It is understood that the vendor will permit the customer to turn a reserve processor into an active processor in a particular partition, as long as an active processor is turned into a reserve processor in another partition, so as to always keep the total number of reserve processors the same or constant (i.e., 8 reserve processors). Assuming that partition 18c commences to receive an increasing number of transactions and demands more processing power, a control system like a Workload Manager (WLM) described in previously indicated U.S. patent application Ser. No. 09/493,753 may detect the need to increase the number of active processors in partition 18c. Simultaneously, the control system selects a partition (a donor partition) that will donate one or more processors on behalf of partition 18c. A mechanism or control system for selecting a donor partition is described in previously indicated U.S. patent application Ser. No. 09/562,590. Assuming that partition 18b is selected as the donor partition, the WLM (e.g., Workload Manager 14) will activate one or more reserve processors in partition 18c, and concurrently deactivate one or more processors in partition 18b. In an embodiment of the invention, the number of reserve processors activated will be the same as the number of active processors deactivated. Thus, if one reserve processor is activated in partition 18c, one active processor will be deactivated in partition 18b.

In the embodiment of the invention illustrated in FIG. 3, two reserve processors 32c were activated in partition 18c while two active processors 30b were deactivated in partition 18b. After the processor rebalancing operation, partition 18b has 4 active processors 30b and 4 reserve processors 32b, and partition 18c has 4 active processors 30c and no reserve processors 32c. The total number of reserve processors in reserve processor pool 28 is still the same (i.e., 8 reserve processors). The reserve processors, however, were allocated differently. Partition 18b has increased it reserve processor pool 28b from 2 reserve processors 32b to 4 reserve processors 32b. Partition 18c now has no reserve processors 32c because the two reserve processors 32c it originally had have be activated to respond to peak demand. Thus, if the reserve processors 32c are being managed by a vendor-sponsored Capacity on Demand program, the customer would not have to pay for those reserve processors 32c because the number of reserve processors in the entire partitioned server 10 has remained the same (i.e., 8 reserve processors).

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for automatically allocating computing resources in a partitioned server, the method comprising:
   identifying in a partitioned server a first partition having at least one reserve processor available for activation to meat service level objectives associated with applications running on the first partition;
   identifying in the partitioned server a second partition having at least one active processor;
   wherein each of the first partition and the second partition is a hardware-based partition;
   activating the at least one reserve processor in the first partition so that the first partition has an activated processor and the second partition does not have the activated processor; and
   deactivating the at least one active processor in the second partition so that the at least one active processor becomes a second reserved processor in the second partition and the second partition has a deactivated processor and the first partition does not have the deactivated processor, and so that a total number of reserved processors in the partitioned server remains constant after activating the at least one reserved processor;
   wherein a number of reserve processors activated in the partitioned server is equal to a number of active processors deactivated in the partitioned server;
   wherein the number of reserve processors is at a same amount, before activating the at least one reserve processor and after activating the at least one reserve processor; and
   wherein each reserve processor is available for operation as an active processor in the partitioned server.

2. The method of claim 1 additionally comprising collecting active processor requests in the first partition.

3. The method of claim 2 additionally comprising adjusting the active processor requests in accordance with a number of reserve processors in the first partition.

4. The method of claim 1 wherein a number of reserve processor activated in the first partition is equal to a number of active processors deactivated in the second partition.

5. The method of claim 1, wherein the activated processor does not cross a boundary of the first partition and the deactivated processor does not cross a boundary of the second partition.

6. A method for automatically allocating computing resources in a partitioned server, the method comprising:
   collecting from a partitioned server an active-processor resource request at a first priority level;
   determining that all active processor resources for all partitions in the partitioned server have already been allocated at the first priority level;
   collecting from each partition in the partitioned server active-processor resource requests at a second priority level which is lower than the first priority level;
   identifying in the partitioned server a first partition having at least one active processor which is not allocated at the second priority level;
   identifying in the partitioned server a second partition having at least one reserve processor and which is requesting at least one active processor at the second priority level;
   wherein each of the first partition and the second partition is a hardware-based partition;
   activating the at least one reserve processor in the second partition so that the second partition has an activated processor and the first partition does not have the activated processor;
   wherein the number of reserve processors is at a same amount, before activating the at least one reserve processor and after activating the at least one reserve processor; and
   deactivating the at least one active processor in the first partition so that the first partition has a deactivated processor and the second partition does not have the deactivated processor;
   wherein a number of reserve processors activated in the partitioned server is equal to a number of active processors deactivated in the partitioned server; and wherein each reserve processor is available for operation as an active processor in the partitioned server.

7. The method of claim 6 additionally comprising adjusting the active-processor resource requests at the second priority level to take into account whether there are reserve processors available in the second partition that are capable of satisfying the active-processor resource requests at the second priority level.

8. The method of claim 6, wherein the activated processor does not cross a boundary of the second partition and the deactivated processor does not cross a boundary of the first partition.

9. A system for automatically allocating computing resources in a partitioned server comprising:
a workload manager; and
a partitioned server coupled to the workload manager and including a plurality of partitions having active processors and a number of reserve processors;
wherein the plurality of partitions comprises a first partition and a second partition and wherein each of the first partition and the second partition is a hardware-based partition;
wherein the workload manager activates a reserve processor in the first partition so that the first partition has an activated processor and the second partition does not have the activated processor; and
wherein the workload manager deactivates an active processor in the second partition so that the active processor becomes a second reserved processor in the second partition and the second partition has a deactivated processor and the first partition does not have the deactivated processor and so that a total number of reserved processors in the partitioned server remains constant after activating the reserved processor;
wherein a number of reserve processors activated in the partitioned server is equal to a number of active processors deactivated in the partitioned server;
wherein the number of reserve processors is at a same amount, before activating the reserve processor and after activating the reserve processor; and
wherein each reserve processor is available for operation as an active processor in the partitioned server.

10. The system of claim 9 wherein a number of reserve processors remains the same regardless of a number of active processors deactivated in the second partition and a number of reserve processors activated in the first partition.

11. The system of claim 9, wherein the activated processor does not cross a boundary of the first partition and the deactivated processor does not cross a boundary of the second partition.

12. A system for automatically allocating computing resources in a partitioned server comprising:
a partitioned server including a plurality of partitions including a first partition and second partition, wherein each of the first partition and the second partition is a hardware-based partition; and
means, coupled to the partitioned server, for determining that the first partition of the partitioned server requires the activation of at least one reserve processor in the first partition and for determining that a the second partition of the partitioned server has at least one active processor to be deactivated in the second partition;
wherein the determining means activates the at least one reserve processor in the first partition so that the first partition has an activated processor and the second partition does not have the activated processor; and
wherein the determining means deactivates the at least one active processor in the second partition so that the second partition has a deactivated processor and the first partition does not have the deactivated processor one;
wherein a number of reserve processors activated in the partitioned server is equal to a number of active processors deactivated in the partitioned server;
wherein the number of reserve processors is at a same amount, before activating the at least one reserve processor and after activating the at least one reserve processor; and
wherein each reserve processor is available for operation as an active processor in the partitioned server.

13. The system of claim 12, wherein the activated processor does not cross a boundary of the first partition and the deactivated processor does not cross a boundary of the second partition.

* * * * *

UNITED STATES PATENT AND TRADEMARK OFFICE
CERTIFICATE OF CORRECTION

| | |
|---|---|
| PATENT NO. | : 7,451,183 B2 |
| APPLICATION NO. | : 10/394608 |
| DATED | : November 11, 2008 |
| INVENTOR(S) | : Francisco J. Romero et al. |

It is certified that error appears in the above-identified patent and that said Letters Patent is hereby corrected as shown below:

In column 13, line 62, in Claim 1, delete "meat" and insert -- meet --, therefor.

In column 16, line 18, in Claim 12, after "that" delete "a".

Signed and Sealed this

Thirty-first Day of March, 2009

JOHN DOLL
*Acting Director of the United States Patent and Trademark Office*